US 6,747,385 B2

(12) United States Patent
Huang et al.

(10) Patent No.: US 6,747,385 B2
(45) Date of Patent: Jun. 8, 2004

(54) MOTOR STRUCTURE

(75) Inventors: Wen-shi Huang, Taoyuan (TW);
Kuo-cheng Lin, Taoyuan (TW);
Chu-hsien Chou, Taoyuan (TW);
Ming-shi Tsai, Taoyuan (TW)

(73) Assignee: Delta Electronics, Inc. (TW)

( * ) Notice: Subject to any disclaimer, the term of this patent is extended or adjusted under 35 U.S.C. 154(b) by 105 days.

(21) Appl. No.: 10/209,999

(22) Filed: Jul. 31, 2002

(65) Prior Publication Data

US 2002/0190602 A1 Dec. 19, 2002

Related U.S. Application Data

(63) Continuation-in-part of application No. 09/676,266, filed on Sep. 28, 2000, now Pat. No. 6,509,666.

(30) Foreign Application Priority Data

Jul. 7, 2000 (TW) ........................................ 89113642 A

(51) Int. Cl.$^7$ ................................................. H02K 1/00
(52) U.S. Cl. ...................... 310/216; 310/254; 310/67 R
(58) Field of Search ................................. 310/216, 254, 310/267, 268, 257, 263, 67 R

(56) References Cited

U.S. PATENT DOCUMENTS

| 4,246,504 A | 1/1981 | Clifford et al. ............. 310/181 |
| 4,459,501 A | 7/1984 | Fawzy ........................ 310/156 |
| 4,949,000 A | 8/1990 | Petersen ..................... 310/179 |
| 5,193,084 A | 3/1993 | Christiaens ................. 369/258 |
| 5,559,382 A | 9/1996 | Oku et al. .................... 310/90 |
| 5,780,944 A | 7/1998 | Sakamoto ................. 310/49 R |
| 5,831,356 A | 11/1998 | Aoshima .................. 310/49 R |
| 5,854,526 A | 12/1998 | Sakamoto ................... 310/254 |
| 6,172,440 B1 | 1/2001 | Sasaki et al. ............... 310/156 |
| 6,285,108 B1 | 9/2001 | Horng ........................ 310/259 |
| 6,320,294 B1 | 11/2001 | Kliman ....................... 310/257 |

*Primary Examiner*—Tran Nguyen
(74) *Attorney, Agent, or Firm*—Martine & Penilla, LLP

(57) ABSTRACT

A motor structure includes a stator and a rotor. The stator includes a coil assembly which includes a ring-shaped slot having an inner periphery on its inner side and an outer periphery on its outer side away from the inner periphery, a plurality of first teeth mounted around the inner periphery of the ring-shaped slot, and a plurality of second teeth mounted around the outer periphery of the ring-shaped slot; wherein each of the first teeth is arranged to partly fall behind or exceed the corresponding one of the second teeth, and a coil wound in the ring-shaped slot. The rotor includes a circular magnet located above the coil.

16 Claims, 7 Drawing Sheets

MOTOR STRUCTURE

CROSS-REFERENCE TO RELATED APPLICATIONS

The present application is a CIP (Continuation-in-Part) of U.S. patent application Ser. No. 09/676,266, filed on Sep. 28, 2000, now U.S. Pat. No. 6,509,666 entitled "Motor Structure," and is herein incorporated by reference.

BACKGROUND OF THE INVENTION

1. Field of the Invention

The present invention relates to a motor structure, in particular, to a thin motor structure.

1. Description of the Related Art

Recently, it is a tendency to make electrical products thin and small. Notebooks and cellphones are examples. According to the development of thin electrical products, a thin fan motor structure is necessarily needed.

For a designer, it is not satisfied to develop a thin motor structure utilizing the stator structure of the conventional motor. In addition, there are difficulties in manufacturing a thin conventional stator structure.

FIG. 1 is a partial cross-sectional view showing a conventional motor structure. FIG. 2 is a front view showing the motor structure as shown in FIG. 1. Referring to FIGS. 1 and 2, the motor structure includes a magnet ring 100 and a stator 200. The magnet ring 100 is a part of a rotor (not completely shown). The stator 200 includes a set of silicon steel sheets 201 with four poles and coils (wirings) 202 wound on the silicon steel sheets 201.

Since each of the silicon steel sheets 201 composes a plurality of silicon steel sheets in a stack manner as shown in FIG. 2, the edges of the silicon steel sheets 201 are sharp. In this case, each of the silicon steel sheets 201 needs to be covered with a film or cover (not shown) so that the coils 202 can be wound without damage.

Moreover, since the circular areas surrounded by the silicon steel sheets 201 can not be totally filled by the coils, a lot of space is wasted and the performance of the motor deteriorates.

Accordingly, several problems that may occur in thinning a motor structure as described below must be resolved.

(a) The motor performance deterioration as a result of the decrease in the count of the silicon steel sheets and the space for winding coils.

(b) The manufacture and assembly difficulty of the motor as a result of the demand for small size and strict tolerance of the stator.

(c) The coils wound on the silicon steel sheets of a thin stator being apt to damage and short-circuit as a result of the relatively sharp edge of the silicon steel sheets.

(d) As far as the rotating stability of the motor is concerned, it is preferred to increase the number of poles configured on the motor. In this case, however, there exists difficulty in winding the coils. In addition, the motor may start with vibration and rotate with instability because the poles of motor are improperly configured.

In the above-mentioned problems, it is noted that the rotating stability is critical in the performance of a motor structure, especially a thin motor structure. Thus, it is important to design a thin motor structure that can easily start without vibration and rotate without instability. Therefore, the present invention intends to provide a motor structure that can be started without vibration, rotates without instability, and satisfies the demands for thinning.

SUMMARY OF THE INVENTION

It is therefore an object of the present invention to provide a thin motor structure having sufficient space for winding coils, and capable of facilitating the winding.

It is another object of the present invention to provide a thin motor structure having the merits of easy manufacture and assembly.

It is still another object of the present invention to provide a thin motor structure having a small and thin size stator which can be configured to facilitating the pole's configuration of the motor.

It is still another object of the present invention to provide a thin motor structure capable of enabling the motor to start without vibration and to rotate without instability.

It is still another object of the present invention to provide a thin motor structure which can be easily started by utilizing the magnetic bias to balance the torque.

Accordingly, a motor structure according to the present invention comprises a stator and a rotor. The stator comprises a coil assembly, which includes a ring-shaped slot having an inner periphery on its inner side and an outer periphery on its outer side away from the inner periphery, a plurality of first teeth mounted around the inner periphery of the ring-shaped slot, and a plurality of second teeth mounted around the outer periphery of the ring-shaped slot; wherein each of the first teeth is arranged to partially trail behind the corresponding second tooth in a circumferential direction of the ring-shape slot. The rotor includes a circular magnet located above the coil.

In one aspect of the present invention, both the first teeth and the second teeth are selected as one configuration from a group consisting of chamfered teeth, teeth with round top corners, and teeth with indentations.

In another aspect of the present invention, the motor structure further comprises a base on which the coil assembly is mounted. In addition, a ring-shaped concavity is formed on the base.

In still another aspect of the present invention, the stator of the motor structure further comprises a static shaft substantially perpendicular to, and fixed on the base, and a ring-shaped groove being formed around the static shaft. The rotor of the motor structure further comprises a hub in which a through hole is formed; a metal sheet arranged between the hub and the circular magnet; and a bearing positioned in the through hole and being penetrated by the static shaft. In addition, the motor structure further comprises an engagement ring positioned in the through hole and on the bearing for fixing the bearing; and an elastic ring positioned in the ring-shaped groove for elastically fixing the bearing.

DETAILED DESCRIPTION OF THE INVENTION

The preferred embodiments of the invention will be described in detail with reference to FIGS. 3 to 7.

Figure 1:
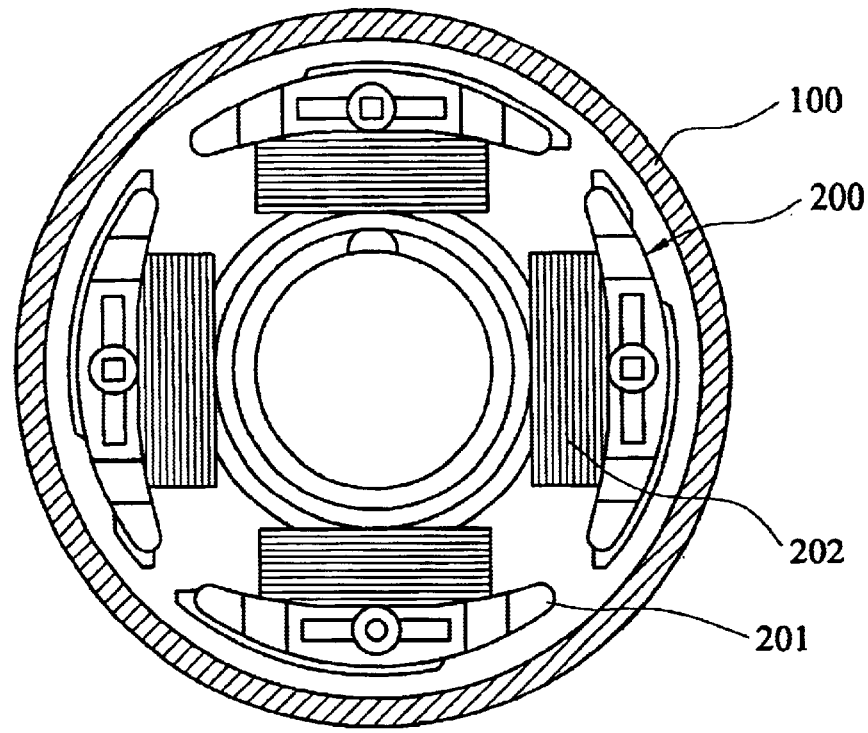
FIG. 1 is a partial cross-sectional view showing a conventional motor structure.
Figure 2:
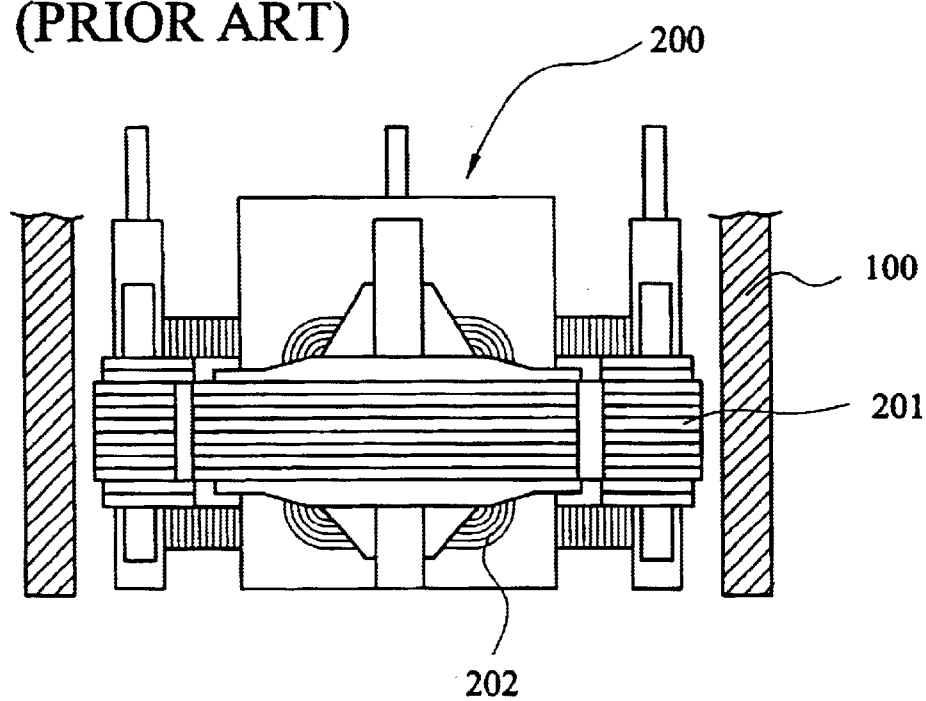
FIG. 2 is a front view showing the motor structure as shown in FIG. 1.
Figure 3:
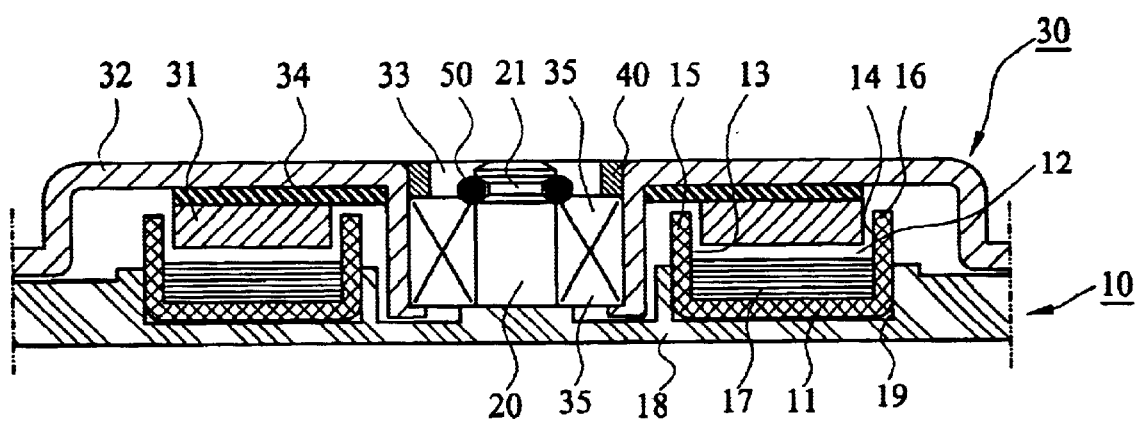
FIG. 3 is a partial cross-sectional view showing a motor structure in accordance with one embodiment of the invention.

FIG. 3 is a partial cross-sectional view showing a motor structure in accordance with one embodiment of the invention. As shown in FIG. 3, the motor structure mainly comprises a stator 10 and a rotor 30, and further a base 18.

The stator 10 includes a coil assembly 11 and a coil 17. The coil assembly 11 is arranged to have a ring-shaped slot 12, four first teeth 15, and four second teeth 16. The ring-shaped slot 12 has an inner periphery 13 on its inner side and an outer periphery 14 on its outer side away from the inner periphery. The first teeth 15 are formed around the inner periphery 13 of the ring-shaped slot 12 to function as one set of silicon steel sheets. The second teeth 16 are formed around the outer periphery 14 of the ring-shaped slot 12 to function as another set of silicon steel sheets. Specially, the first teeth 15 and the second tooth 16 are arranged in a staggered manner so that each of the first teeth 15 partly trails behind the corresponding second tooth 16 (shown in FIG. 4). The coil 17 is wound in the ring-shaped slot 12.

Moreover, the stator 10 further includes a static shaft 20 that is substantially perpendicular to and fixed on the base 18, and a ring-shaped groove 21 that is formed on the static shaft 20. In addition, the base 18 is formed with a ring-shaped concavity 19 for the coil assembly 11 to be mounted therein.

The rotor 30 mainly includes a circular magnet 31 and further a hub (e.g. a hub of an impeller) 32, a metal sheet (e.g. an iron sheet) 34, and a bearing 35. The hub 32 is formed with a through hole 33, which is penetrated by the static shaft 20, for positioning the bearing 35. The metal sheet 34 is disposed between the inner side of the hub 32 and the circular magnet 31. It should be noted that the static shaft 20 remains static while the hub 32 and the bearing 35 rotate together in the motor structure.

The motor structure may further include an engagement ring (e.g. a copper sleeve) 40 and an elastic ring (e.g. an O-ring) 50. The engagement ring 40 is positioned in the through hole 33 and on the bearing 35 for fixing the bearing 35 while the elastic ring 50 is positioned in the ring-shaped groove 21 for elastically fixing the bearing 35. The engagement ring 40 and the elastic ring 50 are used together to fix the bearing 35 so as to prevent the bearing 35 and the static shaft 20 from separating along the axial direction of the static shaft 20.

Figure 4:
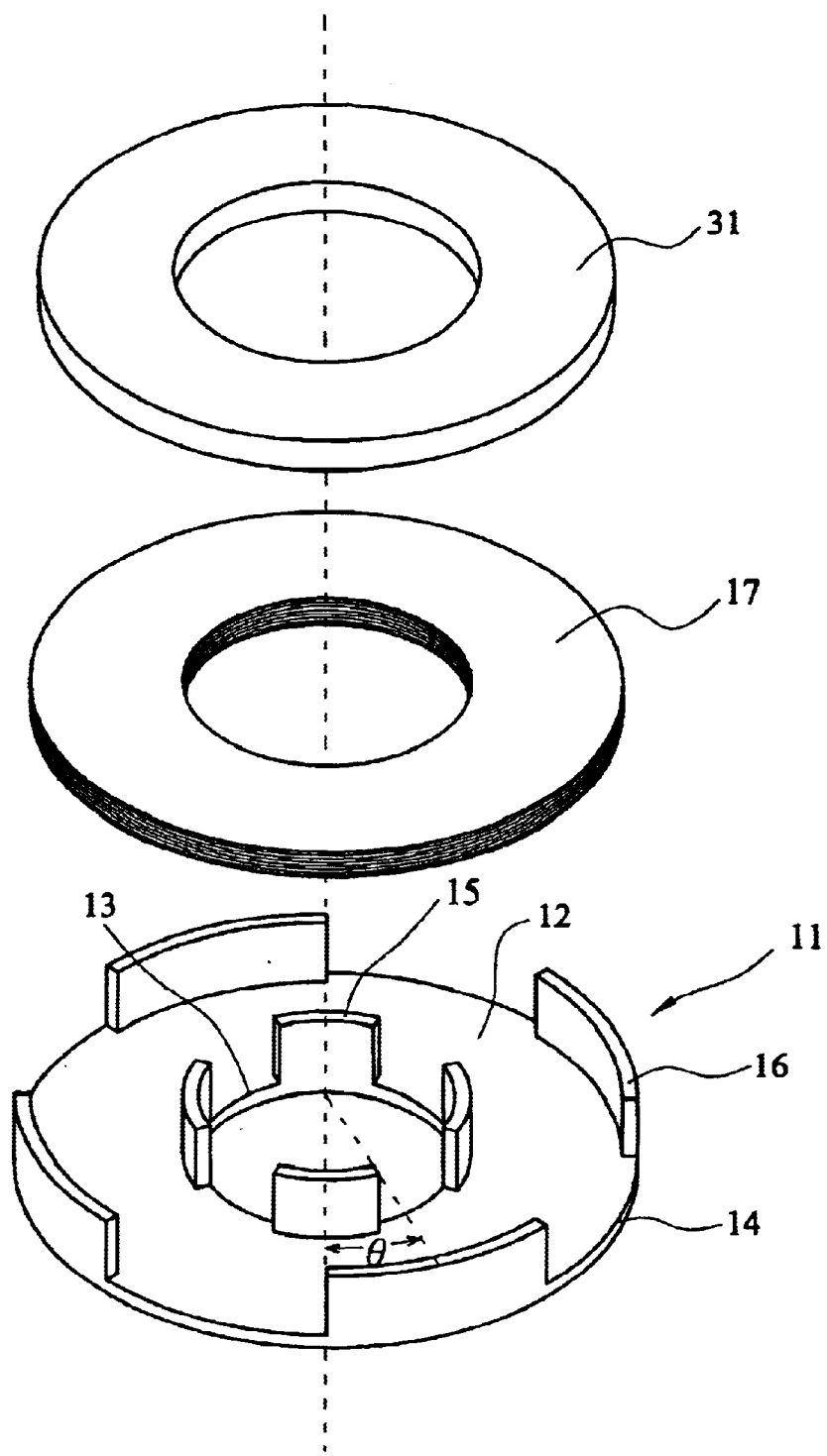
FIG. 4 is a partial exploded view showing the motor structure in accordance with one embodiment of the invention.

FIG. 4 is an exploded view showing the coil assembly 11, coil 17, and circular magnet 31 as shown in FIG. 3. In FIG. 4, the coil 17 is wound in the ring-shaped slot 12 and the circular magnet 31 is located above the coil 17. In addition, the structure of the coil assembly 11 can be clearly seen and it is obvious that the second teeth 16 and the corresponding first tooth 15 are arranged in a staggered manner.

Figure 8:
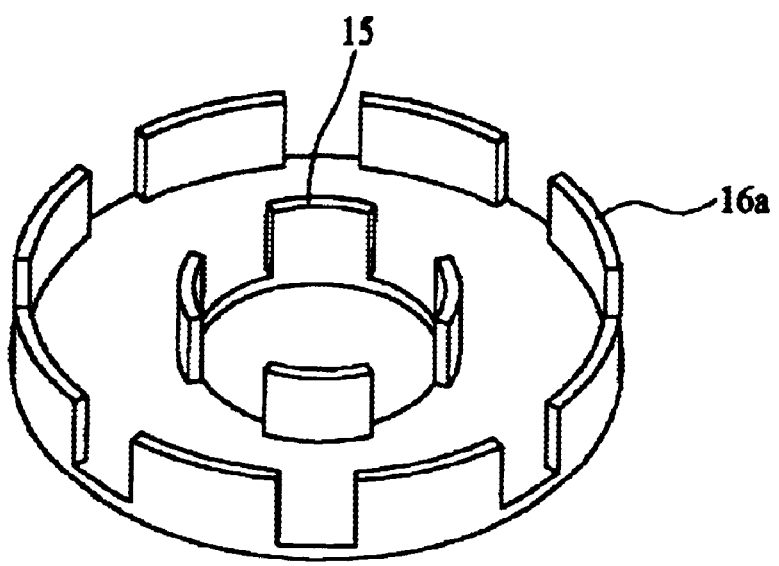
FIG. 8 is a schematic illustration showing that the number of the first teeth and the second teeth in accordance with one embodiment of the invention is unequal.

Specifically, each of the first teeth 15 behind the corresponding second tooth 16 in a circumferential direction of the ring-shape slot with an angle θ which is defined by the central line of each first tooth 15 and the central line of the corresponding second tooth 16. In addition, it is noted that the angle θ depends on not only the number of the first teeth and the second teeth arranged but also the relative position between each of the first teeth and the corresponding second tooth. Thus, the first teeth and the second teeth can be arranged according to the designer's demand by changing the number of the teeth and the relative position of the teeth in order to easily start the motor and effectively increase the performance of the motor structure. For example, as shown in FIG. 8, the number of the second tooth 16a can be 8. Herein, the arrangement of two stators, which is the case of a conventional motor structure in the U.S. Pat. No. 5,831,356, is not necessary. As far as a thin motor structure is concerned, one stator configuration is preferred. Therefore, each of the first teeth can be partly disposed behind or exceed the corresponding second tooth.

Figure 5A:
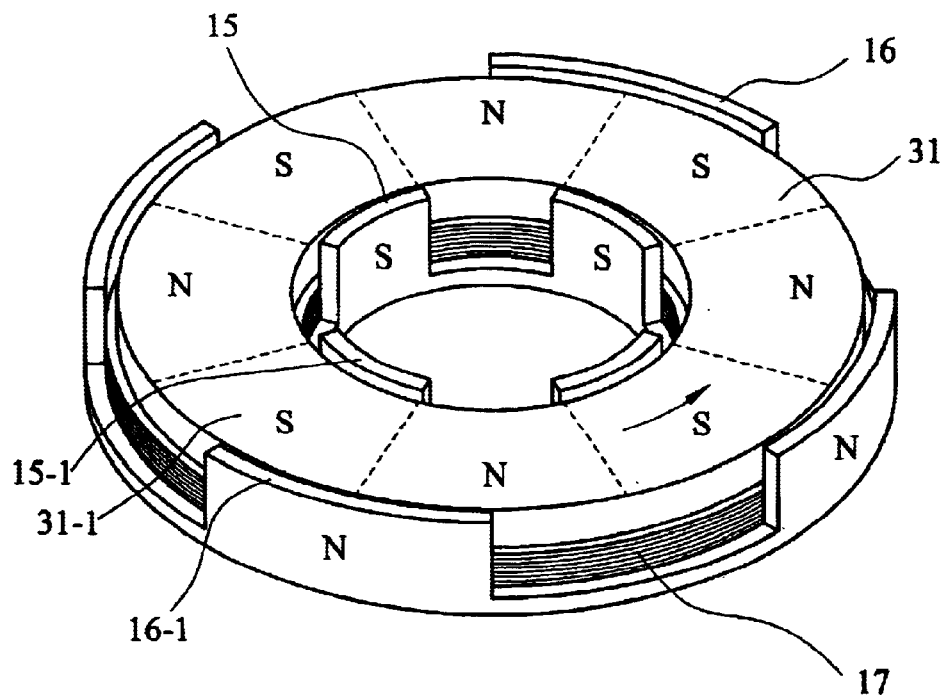
FIG. 5(a) is a schematic illustration showing one rotating condition of the partial motor structure as shown in FIG. 4.
Figure 5B:
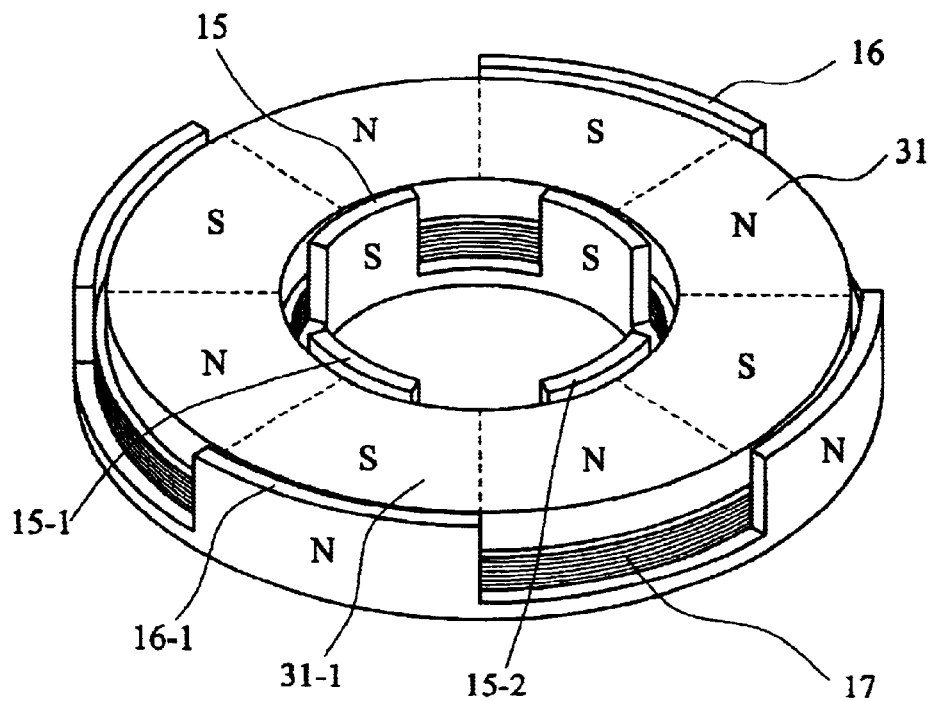
FIG. 5(b) is a schematic illustration showing another rotating condition of the partial motor structure as shown in FIG. 4.

FIGS. 5(a) and 5(b) are schematic illustrations showing one rotating condition of the motor structure as shown in FIG. 4. In this embodiment, when the motor is started, the first teeth 15 and the second teeth 16 are induced by the current flowing through the coil 17 to become magnet sections S and N, respectively. In addition, the circular magnet 31 is magnetized into eight magnet sections such as N, S, . . . , N, S.

To illustrate in a concrete manner, a detail description with reference to the first tooth 15-1, the second tooth 16-1, the magnet section 31-1, and the magnet sections N and S indicated in FIGS. 5(a) and 5(b) is given as follows. Referring to FIG. 5(a), a section 31-1 representing a magnet pole S of the circular magnet 31 is initially located at a position as shown in the figure. Therefore, the section 31-1 will first be attracted by the second tooth 16-1 and then repelled by the first tooth 15-1. Thus, the circular magnet 31 can be turned in a predetermined angle in a counterclockwise direction as indicated by the arrow. After that, the first teeth 15 are magnetized to become magnet sections N while the second tooth 16 are magnetized to become magnet sections S by inverting the direction of the current flowing through the coil. Then, the circular magnet 31 turns forward along the direction of the arrow under the influence of both the repelling and attraction of the second teeth 16 and the first teeth 15. Consequently, the circular magnet 31 may start to rotate.

Referring to FIG. 5(b), the section 31-1 representing a magnet pole S is initially located at another position as shown in the figure. In this case, the section 31-1 will first be repelled by the first tooth 15-1. Then, the circular magnet 31 is turned in another predetermined angle in a counterclockwise direction as indicated by the arrow. After that, the first teeth 15 are magnetized to become magnet sections N while the second tooth 16 are magnetized to become magnet sections S by inverting the direction of the current flowing through the coil. Then, the circular magnet 31 turns forward along the direction of the arrow by the repelling of the second teeth 16-1 and the attraction of the first tooth 15-2. Consequently, the circular magnet 31 may start to rotate.

Accordingly, it is noted that the section 31-1 located at any initial position can be started to rotate by the staggered arrangement of the teeth 15 and 16 without any other forced boost. In other words, the motor structure according to the present invention can be started in an inherent manner. Consequently, the current (or voltage) applied to the coil' can be decreased.

Figure 6A:
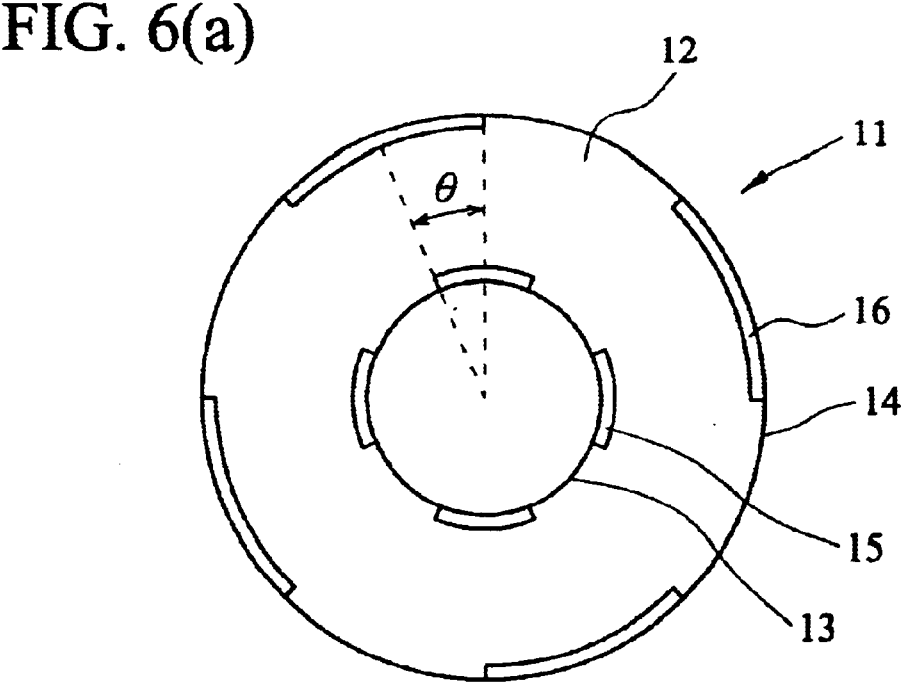
FIG. 6(a) is a top view of the stator showing one arrangement of the first teeth and the second teeth in accordance with one embodiment of the invention, wherein the first teeth fall behind the second teeth with an angle θ.
Figure 6B:
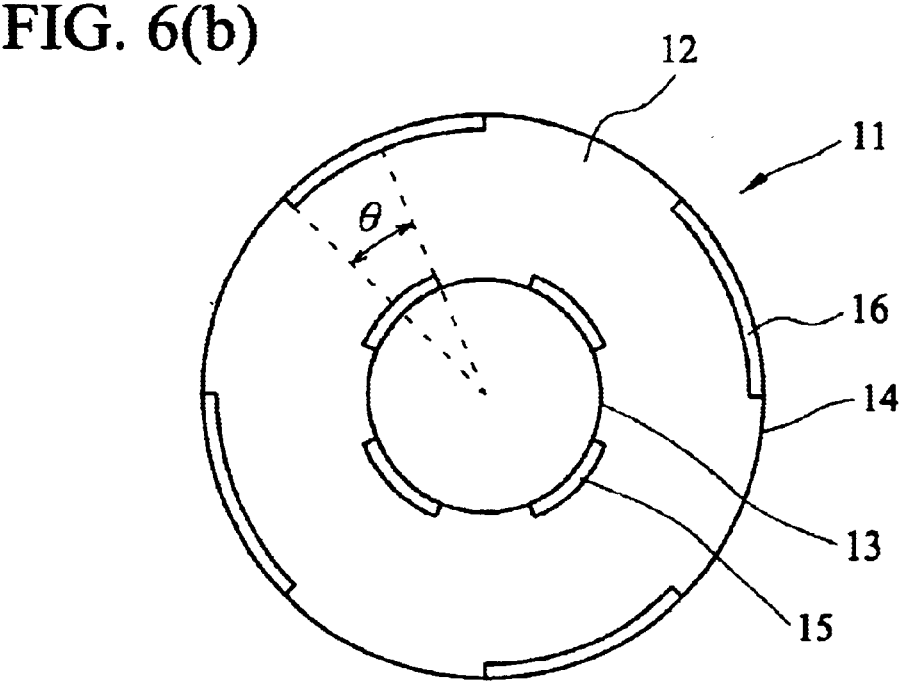
FIG. 6(b) is a top view of the stator showing another arrangement of the first teeth and the second teeth in accordance with one embodiment of the invention, wherein the first teeth exceed the second teeth with an angle θ.

FIGS. 6(*a*) and 6(*b*) shows two arrangements of the first teeth and the second teeth in accordance with one embodiment of the invention. As shown in the figure, the first teeth and the second teeth can be arranged so that each of the first teeth trails behind (FIG. 6(*a*)) or exceed (FIG. 6(*b*)) the corresponding second tooth with an angle θ.

Figure 7:
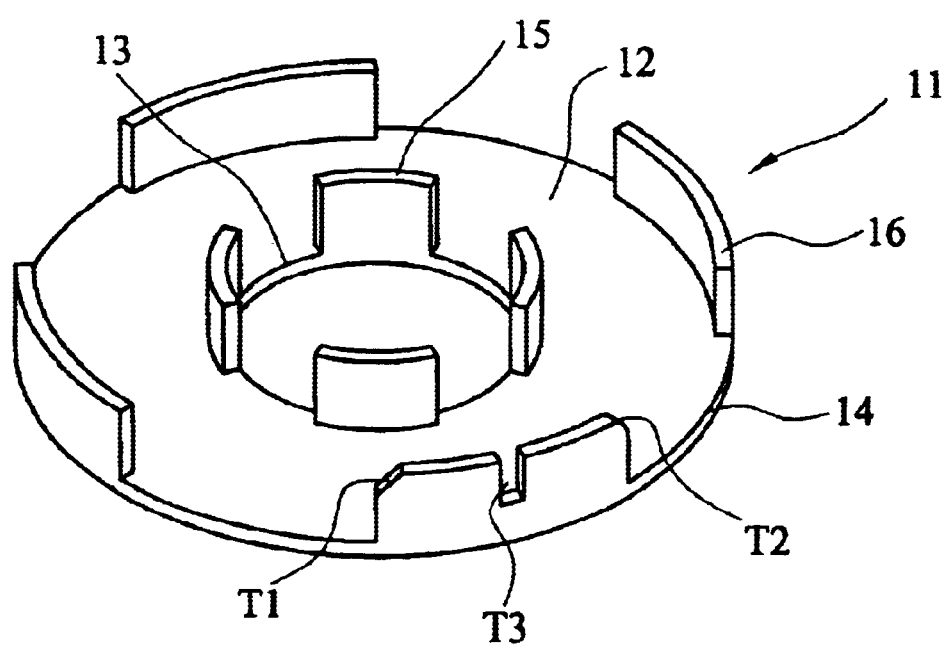
FIG. 7 is a schematic illustration showing that the teeth shapes of the first teeth and the second teeth in accordance with one embodiment of the invention are selected as one configuration from a group consisting of chamfered teeth T1, teeth with round top corners T2, and teeth with indentations T3.

Furthermore, as shown in FIG. 7, both the first teeth 15 and the second teeth 16 can be formed with different configurations so as to easily start the motor through utilizing the magnetic bias to balance the torque. For example, these teeth can be teeth with chamfer T1, teeth with round top corners T2, teeth with indentations T3, and any other suitable shapes.

Hence, the motor structure according to the invention can achieve the following effects by resolving the problems mentioned above in the prior art.

First, since the coil 17 is directly wound in the ring-shaped slot 12 of the coil assembly 11, the winding becomes easy and the problem of occupying a lot of winding space as the prior art no longer exists.

Second, since the ring-shaped slot 12 has a circular surface for winding, the sharp edges that may damage the coil 17 no longer exist in the invention.

Third, since the coil assembly is simply defined by an outer periphery 14, an inner periphery 13, and a ring-shaped slot 12, the coil assembly can be easily manufactured. In addition, the easy winding of the coils and the ring-shaped design of the overall stator enable the easy assembly of the base, the stator, and the rotor.

Fourth, since the winding is simplified in the invention, the number of magnet sections and the teeth can be increased to improve the stability of the motor. In addition, the first teeth and the second teeth can be arranged properly in a staggered manner stated above. Thus, the motor can be started without vibration and be rotated without instability.

It should be understood by one skills in the art that the invention is not limited to the disclosed embodiments, although the invention has been described by way of example and in manner of preferred embodiments. In other words, the present invention intends to cover various modifications without departing the scope and the spirit of the present invention. For instance, the number of the magnet sections on the circular magnet 31 and thus the corresponding number of the first teeth 15 and the second teeth 16 can be increased in order to obtain better performance of the motor. The angle θ mentioned above can be advantageously adjusted for a better start of the rotor of the motor. In addition, the ring-shaped concavity 19 formed on the base can be replaced by a recession only. Accordingly, all such modifications are encompassed by the present invention, which is limited only to the appended claims.

What is claimed is:

1. A motor structure comprising:
 a stator, comprising:
  a coil assembly, including:
   a ring-shaped skit having an inner periphery on its inner side and an outer periphery on its outer side away from said inner periphery
   a plurality of lint teeth mounted around said inner periphery of said ring-shaped slot; and
   a plurality of second teeth mounted around said outer periphery of the ring-shaped slot, wherein each of said lint teeth is arranged to partly trail behind said corresponding second tooth in a circumferential direction of said ring-shape slot; and
  a coil wound in said ring-shaped slot, and
 a rotor including a circular magnet located above said coil.

2. The motor structure according to claim 1, wherein said teeth shapes axe selected as one configuration from a group consisting of chamfered teeth, teeth with round top comas, and teeth with indentations.

3. The motor structure according to claim 1, further comprising:
 a base on which said coil assembly is mounted.

4. The motor structure according to claim 3, wherein a sing-shaped concavity is formed on said base for allowing said coil assembly to be mounted therein.

5. The motor structure according to claim 3, wherein:
 said stator further comprising:
  a static shaft substantially perpendicular to and rued on said base; and
  a ring-shaped groove being formed around said static shaft;
 said rotor further comprising:
  a hub in which a through bole is formed;
  a metal sheet arranged between said hub and said circular magnet; and
  a bearing positioned in said through hole and being penetrated by said static shaft.

6. The motor structure according to claim 5, further comprising:
 an engagement ring positioned in said through hole and on said bearing for fixing said bearing: and
 an elastic ring positioned in said ring-shaped groove for elastically fixing said bearing.

7. A motor structure comprising:
 a stator, comprising:
  a coil assembly, including:
   a sing-shaped slot having an inner periphery on its inner side and an outer periphery on its outer side away from said moor periphery;
   a plurality of first teeth mounted around said inner periphery of said ring-shaped slot; and
   a plurality of second teeth mounted around said outer periphery of the ring-shaped slot, wherein each of said first teeth is arranged to partly exceed said corresponding second tooth in a circumferential direction of said ring-shaped slot; and
  a coil wound in said ring-shaped slot; and
 a rotor including a circular magnet located above said coil.

8. The motor structure according to claim 7, wherein said teeth shapes are selected as coo configuration from a group consisting of chamfered teeth, teeth with round top corners, and teeth with indentations.

9. The motor structure according to claim 7, further comprises a base, said coil assembly being mounted on said base.

10. The motor structure according to claim 9, wherein a ring-shaped concavity is formed on said base for said coil assembly to be mounted therein.

11. The motor structure according to claim 9, wherein:

said stator further comprising:
- a static shaft substantially perpendicular to and fixed on said base; and a ring-shaped groove being fanned around said static shaft;

said rotor further comprising:
- a hub in which a through hole is fanned;
- a metal sheet arranged between said hub and said circular magnet; and
- a bearing positioned in said through hole and being penetrated by said static shift.

12. The motor structure according to claim 11, further comprising:
- an engagement ring positioned in said through hole and on said bearing for fixing said bearing; and
- an elastic ring positioned in said ring-shaped groove for elastically fixing said bearing.

13. A stator structure comprising:
- a ring-shaped slot having an inner periphery on its inner side sod an outer periphery on its outer side away from said inner periphery;
- a plurality of first teeth mounted around said inner periphery of said ring-shaped slot; and
- a plurality of second teeth mounted around said outer periphery of the ring-shaped slot, wherein each of said first teeth is arranged as one of respective arrangements of partly trailing behind said corresponding second tooth in a circumferential direction of said ring-shape slot and partly exceeding said corresponding second tooth in a circumferential direction of said slot.

14. The stator structure according to claim 13, wherein said first and second teeth axe shaped as one configuration selected from a group consisting of chamfered teeth, teeth with round top comets, and teeth with indentations.

15. The stator structure according to claim 13, wherein the number of said first teeth is unequal to dial of said second teeth.

16. A motor structure comprising:

a stator, comprising:
- a coil assembly, including:
  - a ring-shaped slot having an inner periphery on its inner side and an outer periphery on its outer side away from said inner periphery
  - a plurality of first teeth mounted around said inner periphery of said ring-shaped slot; and
  - a plurality of second teeth mounted around said outer periphery of the ring-shaped slot; and
- a coil wound in said ring-shaped slot; and a rotor including a circular magnet located above said coil.

* * * * *